(12) United States Patent
Slater (10) Patent No.: US 7,539,829 B2
(45) Date of Patent: May 26, 2009

(54) METHODS AND APPARATUSES FOR CONTROLLING ACCESS TO AT LEAST ONE STORAGE DEVICE IN A TAPE LIBRARY

(75) Inventor: Alastair Michael Slater, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 11/402,762

(22) Filed: Apr. 11, 2006

(65) Prior Publication Data
US 2006/0242374 A1 Oct. 26, 2006

(30) Foreign Application Priority Data
Apr. 15, 2005 (GB) .................. 0507592.4

(51) Int. Cl.
*G06F 12/00* (2006.01)
(52) U.S. Cl. .................. 711/163; 711/114; 711/156
(58) Field of Classification Search .................. 711/156, 711/162, 163
See application file for complete search history.

(56) References Cited

U.S. PATENT DOCUMENTS

| | | | |
|---|---|---|---|
| 6,385,614 B1 | 5/2002 | Vellandi | |
| 6,765,919 B1 | 7/2004 | Banks et al. | |
| 6,785,786 B1 | 8/2004 | Gold et al. | |
| 6,950,871 B1 * | 9/2005 | Honma et al. | 709/226 |
| 2003/0126361 A1 * | 7/2003 | Slater et al. | 711/114 |
| 2003/0158971 A1 | 8/2003 | Renganarayanan et al. | |
| 2003/0220991 A1 | 11/2003 | Soejima et al. | |
| 2004/0073677 A1 | 4/2004 | Honma et al. | |
| 2004/0143702 A1 | 7/2004 | Valdevit | |
| 2004/0186993 A1 | 9/2004 | Risan et al. | |
| 2004/0218593 A1 | 11/2004 | Hammons et al. | |
| 2004/0243699 A1 | 12/2004 | Koclanes et al. | |
| 2005/0018619 A1 | 1/2005 | Banks et al. | |
| 2005/0065935 A1 | 3/2005 | Chebolu et al. | |
| 2006/0047923 A1 * | 3/2006 | Kodama | 711/161 |
| 2007/0050340 A1 * | 3/2007 | von Kaenel et al. | 707/3 |

OTHER PUBLICATIONS

SmarLine DeviceLock, DeviceLock advertisement at BTSoftware.com; Feb. 22, 2006, two pages.
Technical Questions, 2003-2005 SmartLine Inc. pp. 1-3.
Chris King, Zoning: The Key to Flexible SAN Management, QLogic White Paper 0222202/Rev C; pp. 1-8.
HP StorageWorks SEcure Manager for Tape Libraries . . . ; DA-12038-Version 3-Feb. 7, 2005; pp. 1-5.

* cited by examiner

*Primary Examiner*—Reba I Elmore (57) ABSTRACT

Methods and apparatuses are provided for use in controlling access to at least one data storage device. One method includes obtaining data describing at least one data access relationship, the data access relationship specifying whether access to a data storage device by a data processing device is allowed or not allowed during at least one user defined time period, and controlling access to the data storage device in accordance with the data access relationship described by the data.

17 Claims, 6 Drawing Sheets

METHODS AND APPARATUSES FOR CONTROLLING ACCESS TO AT LEAST ONE STORAGE DEVICE IN A TAPE LIBRARY

RELATED APPLICATIONS

This application for letters patent is related to and claims the benefit of an earlier filing date and right of priority of foreign filed patent application GB 0507592.4, filed in the United Kingdom on Apr. 15, 2005, which is also hereby incorporated by reference.

BACKGROUND

It can be desirable to control access to storage devices within a data storage system or network. For example, data backup tasks are often scheduled to take place at regular intervals and benefit from exclusive use of the storage device during that operation. If another processing device simultaneously attempts to access the storage device upon which the backup copy is being written then it can disrupt the operation.

At present it is possible to define zones within a Storage Area Network (SAN, a network dedicated for transmitting data to/from a data centre separate from the transmission network that is used for general communication between networked computers). However, attempting to use such zones to restrict access to a data storage device when a backup operation is in progress is not a straightforward task. Typically, it would involve a network administrator having to apply configuration scripts to the switches within the SAN, which involves generating an individual set of suitable configuration settings for each switch. Further, setting up switch-based zones can be prone to errors. For example, an inexperienced administrator could introduce a new switch without the correct zoning parameters. Another concern is that zoning does not necessarily exclude the possibility that a "rogue" processing device could attempt to access the storage device during the backup procedure.

Another possible approach is to manually reconfigure a storage device to specify which host or hosts are allowed to access it before, during and after the backup procedure. However, this requires considerable administrator involvement, e.g. the administrator would have to set the appropriate configurations for a tape storage device within a tape library (which can be done using a suitable application such as "HP Secure Manager" produced by Hewlett-Packard Company) before each backup process starts and then re-configure the tape device after the backup has finished to allow it to be accessed by other hosts as normal.

DETAILED DESCRIPTION

Figure 1:
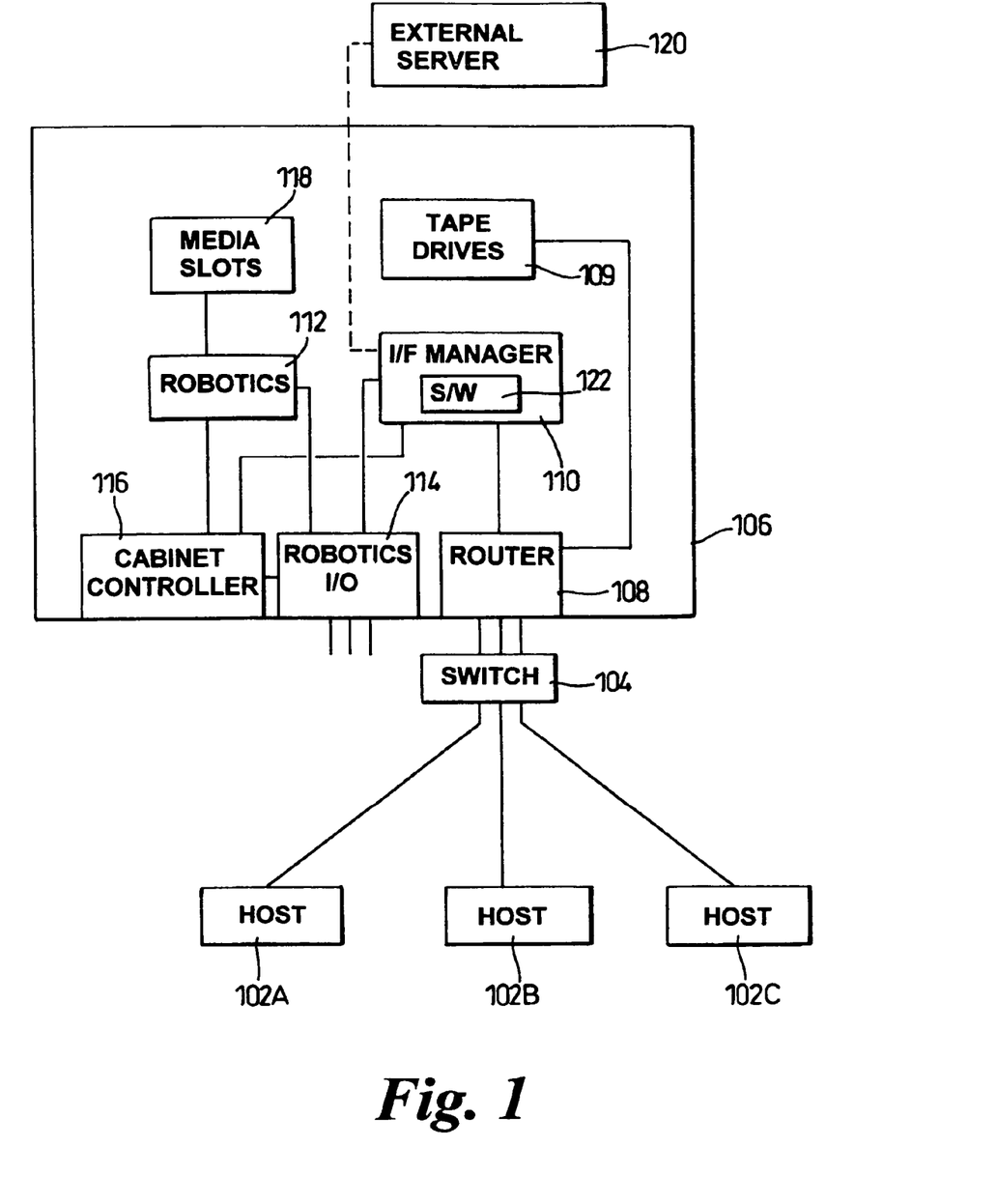
FIG. 1 illustrates schematically a Storage Area Network including a tape library and a plurality of host computers, in accordance with an exemplary embodiment of the invention.

In FIG. 1 a plurality of host computers 102A-102C is connected to a switch 104 by a network link, such as an Ethernet connection, a fibre channel connection, or a SCSI (Small Computer Systems Interface) or internet-SCSI (iSCSI) connection. A fibre channel connection leads from the switch 104 to a data centre including a tape library 106. In the example of FIG. 1, the switch 104 is shown as a component that is separate from and external to the data centre, but in other SANs the switch may be located inside the data centre. It will be appreciated that the embodiments described herein can be used with other types of data storage hardware (including, for example, any non-volatile storage medium such as disk drives, solid state memory or memory cards/sticks) and network configurations.

The tape library 106 comprises hardware components commonly included in conventional tape libraries, such as those manufactured by Hewlett Packard Company, and their function will be well known to the skilled person. The library 106 includes a router 108 that includes a plurality of fibre channel ports used to transfer data to/from the storage system switch 104. The router 108 is sometimes known as an "intelligent controller" and may shield drives located within the library 106 from unwanted SAN traffic, as well as routing wanted traffic. The router is connected to a plurality (e.g. 20) of tape drives 109 by, for example, a fibre channel or SCSI link, or any other convenient type of link.

The router 108 is also connected by, for example, an Ethernet link to an interface manager component 110 that is used for various functions that can include setting up and configuring the router 108. The interface manager component is connected to a robotics input/output component 114. In this example, the robotics input/output component 114 includes fibre channel ports for communication with storage system components external to the library, as well as a link to robotic tape transfer component 112 and a cabinet controller 116. The robotic tape transfer component 112 is used to transfer tape media between a plurality (e.g. 100) of media slots 118 and the tape drives 109 as required.

The interface manager 110 may be connected to an external server 120 by, for example, an Ethernet link. Such external servers are sometimes used with tape libraries to remotely access management functions, typically by a WWW-based interface, or by some other appropriate software based on Storage Management Initiative Specification (SMIS, as disclosed by the Storage Network Industry Association) or Simple Network Management Protocol (SNMP). Typically, software resident on a host computer (e.g. 102A) is used to provide back-up and restore functions for the tape library 106, although there may be some data movement functionality built into the router 108, e.g. known extended copy ("Xcopy" or "third party copy") functionality.

The processor and memory of the interface manager component 110 are configured to execute software 122. Alternatively or additionally, the processor and memory of the router 108 may execute at least part of the software 122. The WWW interface of the external server 120 can also be used to allow a user to interact with the software 122.

Using existing tape library components such as the router or interface manager makes efficient use of resources and can mean that additional/external hardware may not be required to run the software 122. Further, having the acts (e.g., steps) performed by components located within the tape library means that additional software does not have to be downloaded onto or executed by host computers 102A-C.

Figure 2:
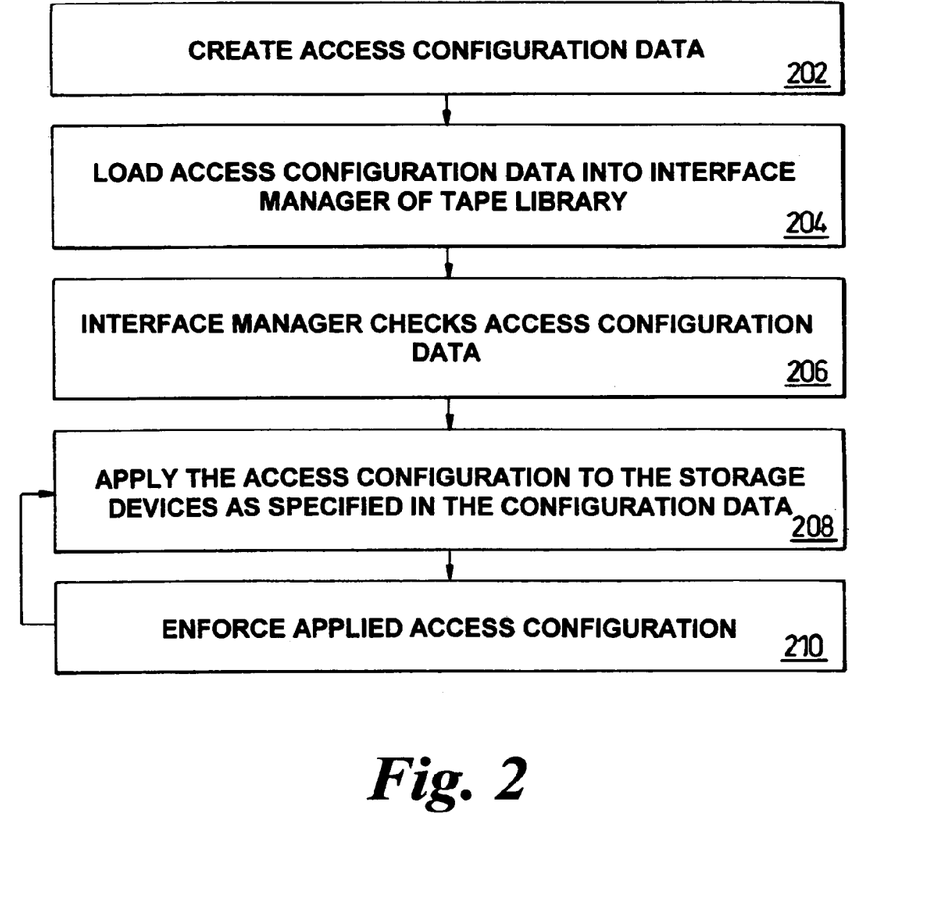
FIG. 2 illustrates schematically an example of acts performed to control access to at least one storage device in the tape library, including acts of applying access configuration data and enforcing an access configuration, in accordance with an exemplary embodiment of the invention.

FIG. 2 illustrates schematically an overview of acts that can be performed using the software 122. At act 202 access configuration data is created. This may be done, for example, using a module of the software 122, or the data could be created using a separate processor/software. The data describes at least one access relationship between at least one of the tape storage devices 109 of the tape library 106 and at least one of the host computers 102. The access relationship specifies whether the host computer(s) is/are allowed (or not allowed) to access (for data transfer purposes) the tape device(s) during one or more defined time periods.

It will be appreciated that the access configuration data can take various forms and can also be created in various ways. In one example, the configuration data can be contained in a text file containing code that is interpreted using an interpreter program, which will typically be part of the software 122 executing on a processor of the interface manager 110. In this example, the file includes a set of identifiers for one or more storage device (typically in the form of World Wide Names (WWN)), a set of identifiers (WWNs) for at least one host computer and one or more access relationship definitions which specify when a particular host is allowed (or not allowed) to access the storage devices. An example of such an access configuration file describing four access relationships is given below:

```
    define tapeWWN1    04fe34541232    # This sets
up the tape storage device having the WWN 04fe34541232 to be
recognised within the access configuration data by the identifier
"tapeWWN1"
    define tapeWWN2    05bd12437754
    define financeqlogic 02fb12112265  # This sets
up the host computer having the WWN 02fb12112265 to be recognised
using the identifier "financeqlogic". It is also possible
to define an identifier covering a group of more than one host
computer, e.g. a set of hosts within a particular department.
The access relationship descriptions now follow:
    tapeWWN1 {
        financeqlogic allow {
            every 1st Sunday 00:00 to 07:00 #   This allows
the host computer "financeqlogic" to access the
"tapeWWN1" storage device during a time period that
corresponds to a scheduled backup window
        }
        02fb12* disallow {
            00:01 to 17:00     # This prevents host
computers whose WWNs start with the characters "02fb12"
(e.g. the host defined as "financeqlogic" above) to
access the "tapeWWN1" storage device during a time period
that corresponds to production hours in an organisation
        }
        02fb12* allow {
            17:01 to 00:00     # This allows the host
computers whose WWNs start with the characters "02fb12" to
access the "tapeWWN1" storage device during non-production
hours, typically after 5 PM
        }
    }
    tapeWWN2 {
        * allow {    # This allows all host computers
(having any WWN) to access "tapeWWN2"
            every monday
        }
    }
```

The lexical analysis phase of the interpreter program can include a mechanism (e.g. ignore "#" symbol and all other characters following it to the end of the line as in the example above) to allow comments to be included in the configuration file. The interpreter program can also allow "wildcard" characters to be used in the file. In the example above, the "*" symbol is used to represent any series of characters as is known in conventional searching interfaces, but it will be appreciated that other wildcard mechanisms could be used. In the case where a user is manually creating or editing an access configuration file using a text editor or the like, the use of wildcards means that the onerous and error prone task of having to retype entire host or tape worldwide names can be avoided. Similarly, the possibility of using meaningful identifiers for hosts/storage devices instead of WWNs makes creation and/or review of an access configuration file easier for the user, although it will be understood that these features are optional.

It is possible to give an outline definition of the syntax of an access configuration file using a format similar to Extended Backus-Naur Form (EBNF) as follows (elaborative comments are provided in C/C++ syntax (delineated by "/*, */")). Items that allow more than one (or lists) of items to be specified are declared as right recursive using "{,}" parentheses:

```
config_file ::= worldwide_name_list
    ;
worldwide_name_list ::= worldwide_name
        | worldwide_name worldwide_name_list
    ;
worldwide_name ::= WWN '{' time_details '}'
    ;
WWN     ::= actual_hex
        | WWN_regex
    ;
actual_hex ::= 'aabbccddeeff'
    ;
/*
| A regex string may be defined to be no longer than the
| possible number of characters in a full WWN definition, but
| allows for '.', '?', '*' regular expression matching characters
| there within.
|   This can be checked by the regex( )/regcomp( ) function for
example once
| parsed and running.
*/
WWN_regex ::= string
    ;
/* given permissions for a tape LUN are a list of hosts along
| with times they are allowed (or disallowed) to access the tape
device
*/
time_details ::= host_WWN_list
    ;
host_WWN_list ::= host_detail
        | host_detail host_WWN_list
    ;
host_detail ::= WWN permission '{' time_specification_list '}'
    ;
permission ::= 'allow'
        | 'disallow'
    ;
time_specification_list ::= time_specification
        | time_specification time_specification_list
    ;
time_specification ::= date
        | repetition hourly_range
        | days
        | date_plus_hours
    ;
date ::= 'dd/mm/yy'
    ;
repetition ::= 'every'      /* allow easy definition of repeated
                                permissions */
```

```
       | 'every 1st' /* 1st <day> of month ..*/
       | 'every 2nd' /* 2nd .. */
       | 'every 3rd' /* 3rd .. */
       | 'every 4th' /* 4th .. */
       | */ no repetition */
       ;
   /*seconds as units of resolution probably too granular.. */
   hourly_range ::= 'hh:mm to hh:mm'
       ;
   /* days of the week, allow short forms too, ideally not case sensitive
either..*/
       days ::= 'monday'     | 'mon'
               |'tuesday'    | 'tues'
               |'wednesday'  | 'weds'
               |'thursday'   | 'thurs'
               |'friday'     | 'fri'
               |'saturday'   | 'sat'
               |'sunday'     | 'sun'
       ;
   date_plus_hours ::= '{' date hourly_range '}'
       ;
```

Variations to this syntax will be apparent to the skilled person. Further features could also be specified in the access configuration data. For example, a time zone could be associated with some or all of the device/access relationship definitions. This can prove useful if, for instance, a host in one time zone is intending to use a drive within a library that is in a different time zone. In the example above, "timezone PST", "timezone GMT" or "timezone UTC" could be associated with the devices to indicate that they operate using Pacific Standard Time, Greenwich Mean Time or Universal Time Coordinated, respectively.

As mentioned above, it is possible for an administrator to create an access configuration data file using a text editor program. However, a specialised software application can be used to create and/or edit the access configuration data. For example, the software application could use a graphical user interface having a visual representation of the host computer and storage devices to allow host computers and/or storage devices to be selected for access configuration, or, as shown in the example screen display of FIG. 3, a set of menus could be used.

Figure 3:
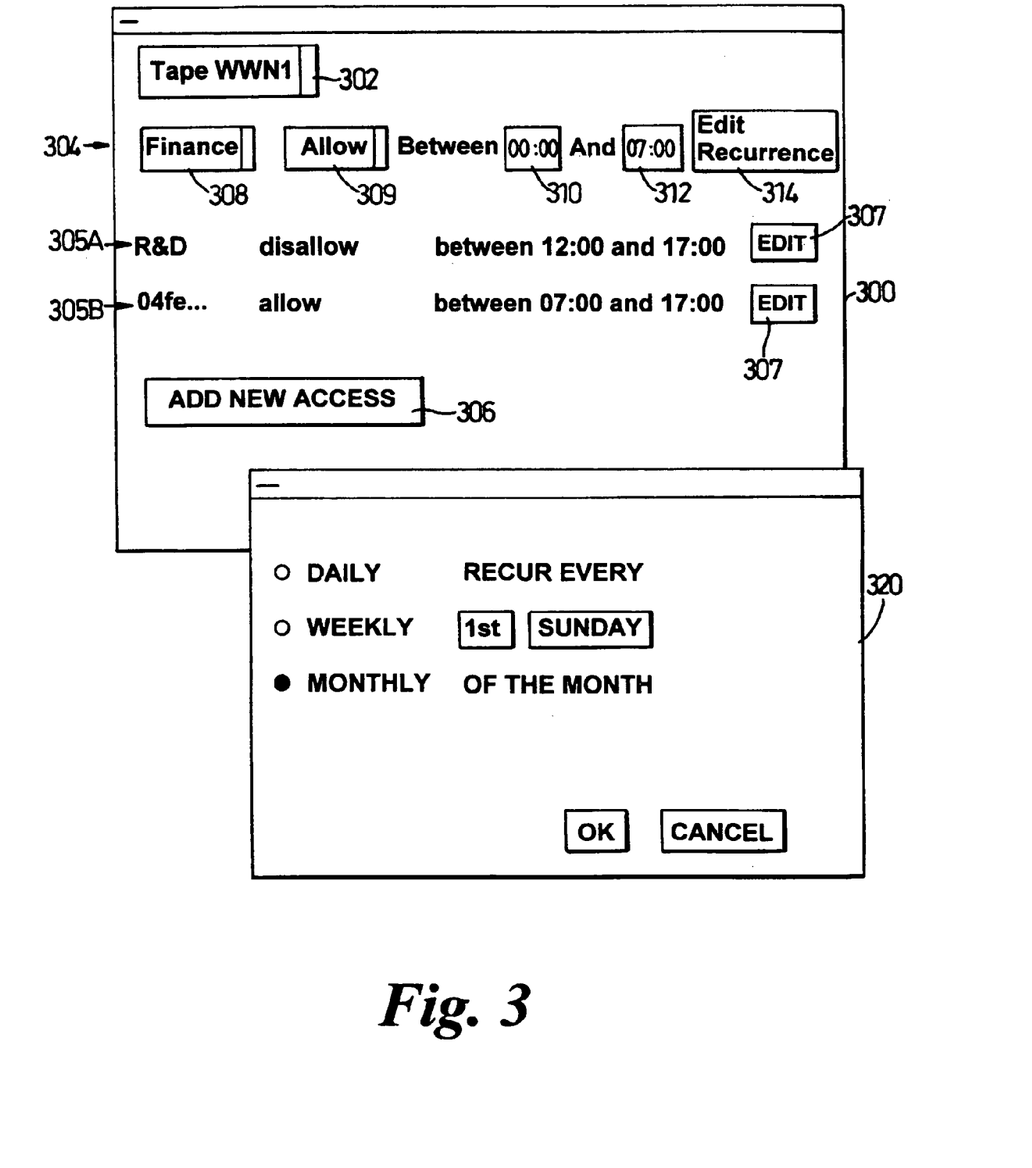
FIG. 3 shows an example of a user interface that can be used to create access configuration data, in accordance with an exemplary embodiment of the invention.

In the example of FIG. 3, a first window 300 of the user interface includes a menu 302, from which a storage device can be selected. The interface further includes an input line 304 containing interactive items that can be used to edit how/when a selected host computer may (or may not) access the selected storage device. Further lines (305A, 305B in the example) display access relationships that have already been created for the selected storage device. The user will typically first select a storage device using menu 302 and then enter a first access relationship using the interactive items on the input line 304. If more than one access relationship is to be created then a user can use an "Add new access" button 306, which moves the relationship on the input line 304 to a display line 305 to allow a new access relationship to be created on the input line. An "Edit" button 307 is located adjacent each display line 305, which can be used to move the corresponding relationship to the input line 304 for amendment/deletion.

Input line 304 includes a menu 308 for selecting a host device, an "allow/disallow" menu 309 for specifying whether the selected host is to be allowed or preventing from accessing the selected storage device 302 during a time period that is defined using start time box 310 and end time box 312. The input line also includes an "Edit recurrence" button 314. When the button 314 is selected, a second window 320 opens that allows the user to specify a repetition of the access relationship entered on the input line 304. That is, the access relationship on the input line 304 (which specifies a host and a time period during which that host is allowed/not allowed to access the selected storage device) can further specify the frequency at which that period of access/no access is to take place. There may be a default recurrence setting, e.g. daily. In the example, the interactive items of the window 320 have been used to set up a monthly recurrence pattern, where the access relationship is repeated every first Sunday of the month between 00:00 and 07:00 hours (this corresponds to the first access relationship of the example access configuration file above). Further user interface items may also be used, e.g. ones for defining the identifiers corresponding to WWNs.

It will be appreciated that the access relationship creation/editing process outlined above and in FIG. 3 is exemplary only and other ways of specifying access relationships will be apparent to the skilled person. For example, a start time and duration could be entered instead of a start time and an end time. A calendar/clock display could be used to specify times and recurrence patterns. A recurrence could be made on an hourly, daily, weekly, monthly or annual basis and the user may be allowed to specify a particular date, date range, day of the week or other temporal units. Further, data based on user specified time periods from other applications/data files could be imported into the access configuration file creation/editing software, e.g. data specifying host/storage devices and time periods from a backup schedule. It is also possible import data relating to data storage/processing devices, e.g. by scanning the tape library to obtain the WWNs of all its tape devices (and possibly defining default identifiers for them). This operation may be performed on a regular basis (e.g. according to a schedule or each time the file creating/editing software is opened) to ensure that newly added tape devices are included in the access configuration file.

The interactive items of window 300 can be used to set up access relationships for as many of the storage devices as required and all of these can be saved in an access configuration file by the application. Multiple access configuration files can be created that define different patterns of host access permission. This allows connectivity to be delivered and restricted on a much more dynamic basis than is currently possible without significant administrator involvement. It will be understood that the access configuration data need not be saved as a text file as given in the example. The data could be stored in a database or using any suitable data structure, which may be in a primarily machine-readable format, rather than one intended to be read by a human or interpreter program.

Returning to the process overview of FIG. 2, at act 204 the access configuration data is loaded into the memory of the interface manager 110 for use with the software 122. Act 206 is optional and involves the interface manager checking if the access configuration data is valid, e.g. checking whether any of the access relationships it describes include temporal overlaps. If such errors are found then the process may respond in various ways, e.g. displaying an error message or requesting correction of the access configuration data. It will be appreciated that act 206 is optional because the software for creating the access configuration data could perform similar checks before saving the access configuration file.

At act 208 the interface manager applies the access configuration settings as specified in the configuration data to the storage devices and at act 210 the access configuration settings are enforced. It will be appreciated that there are several ways of implementing these acts. In the example, the router 108 is configured so that it may detect which host device is seeking access to which tape drive(s) 109 of the library 106. The router may communicate with the interface manager 110 to check whether the host making the request is allowed access to the tape drive at that particular point in time according to the configuration data and, depending on the outcome of that check, access is either permitted or denied. The execution of acts 208 and 210 will normally be continuous, unless the process is deactivated.

Figure 4:
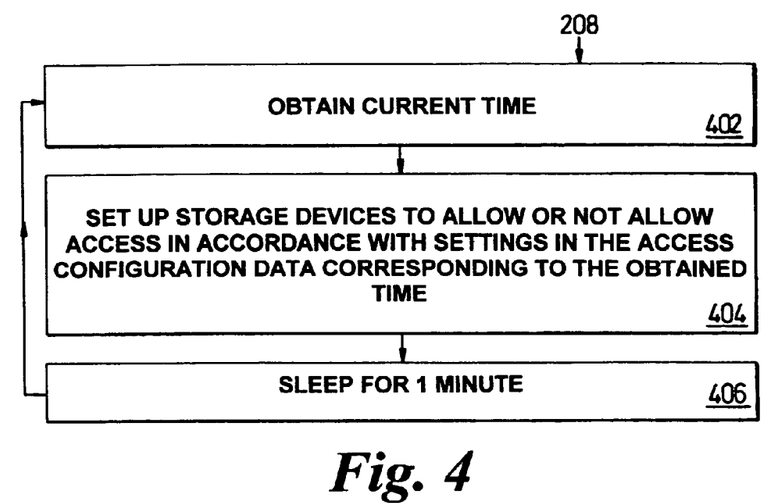
FIG. 4 illustrates schematically an example of acts involved in applying an access configuration, in accordance with an exemplary embodiment of the invention.

FIG. 4 illustrates a first example of acts that may be performed during the application of access configuration process 208 of FIG. 2. At act 402, the interface manager obtains data representing the current time. This may be obtained directly from an onboard clock device, or it may be obtained from another source, e.g. via Network Time Protocol (NTP). In embodiments where the access configuration data can associate time zones with relationships/devices and the process is to control devices in more than one time zone, then the different times will be taken into account. For example, the obtained current time may be converted into the corresponding time within a time zone associated with each storage device to be configured.

At act 404 the interface manager communicates with the router 108 to provide it with details of which hosts are allowed to access which storage devices within the library at that time. Typically this will involve transferring identifiers of hosts to the router 108, which is then configured to only allow access to the hosts corresponding to the identifiers that have been transferred to it (and can also prevent unauthorised hosts form accessing storage devices within the library if so specified by the access configuration data). Such access control functionality is available in the existing application "HP StorageWorks Secure Manager for Tape Libraries" by Hewlett Packard Company, but this currently requires an administrator to manually enter the configuration settings.

At act 406 the software 122 "sleeps" for a specific period of time, e.g. 1 minute (as the access configuration data in the example does not allow access settings to be changed during a time interval shorter than a minute), before control is passed back to act 402.

Figure 5:
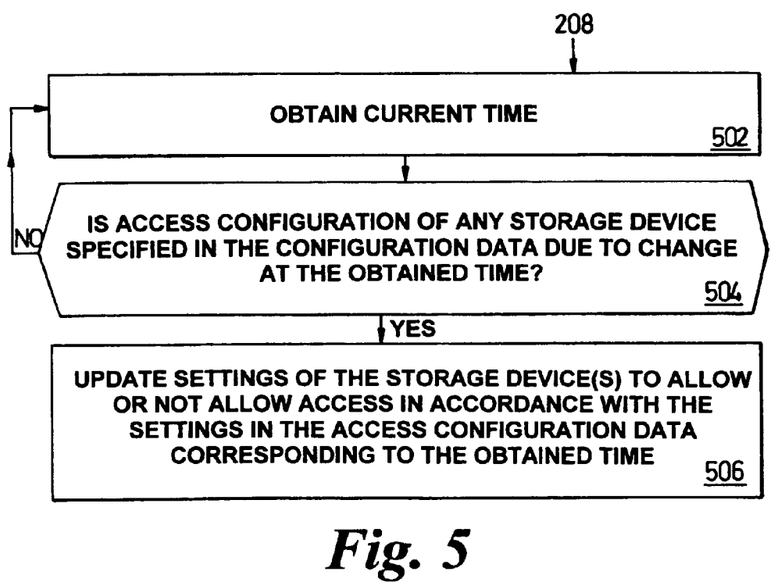
FIG. 5 illustrates schematically another example of acts involved in applying an access configuration, in accordance with an exemplary embodiment of the invention.

FIG. 5 illustrates another example of acts that can be performed during the application of access configuration process 208. At act 502, data representing the current time is obtained (which may be converted into the corresponding time within another time zone if appropriate). At act 404 a check is carried out as to whether the access configuration data specifies that the access configuration of any storage device is to change at that time. If the result of this check is negative then control passes back to act 502, otherwise at act 506 the interface manager communicates with the router 108 to provide it with details of which hosts are allowed (or not allowed) to access which storage devices 109 within the library 106 in a similar manner to act 404 above. It will be appreciated that these acts could be modified so that a check is performed as to whether the access configuration is set to change at a point in future (e.g. 1 minute ahead), so that access configuration settings can be updated in advance.

Figure 6:
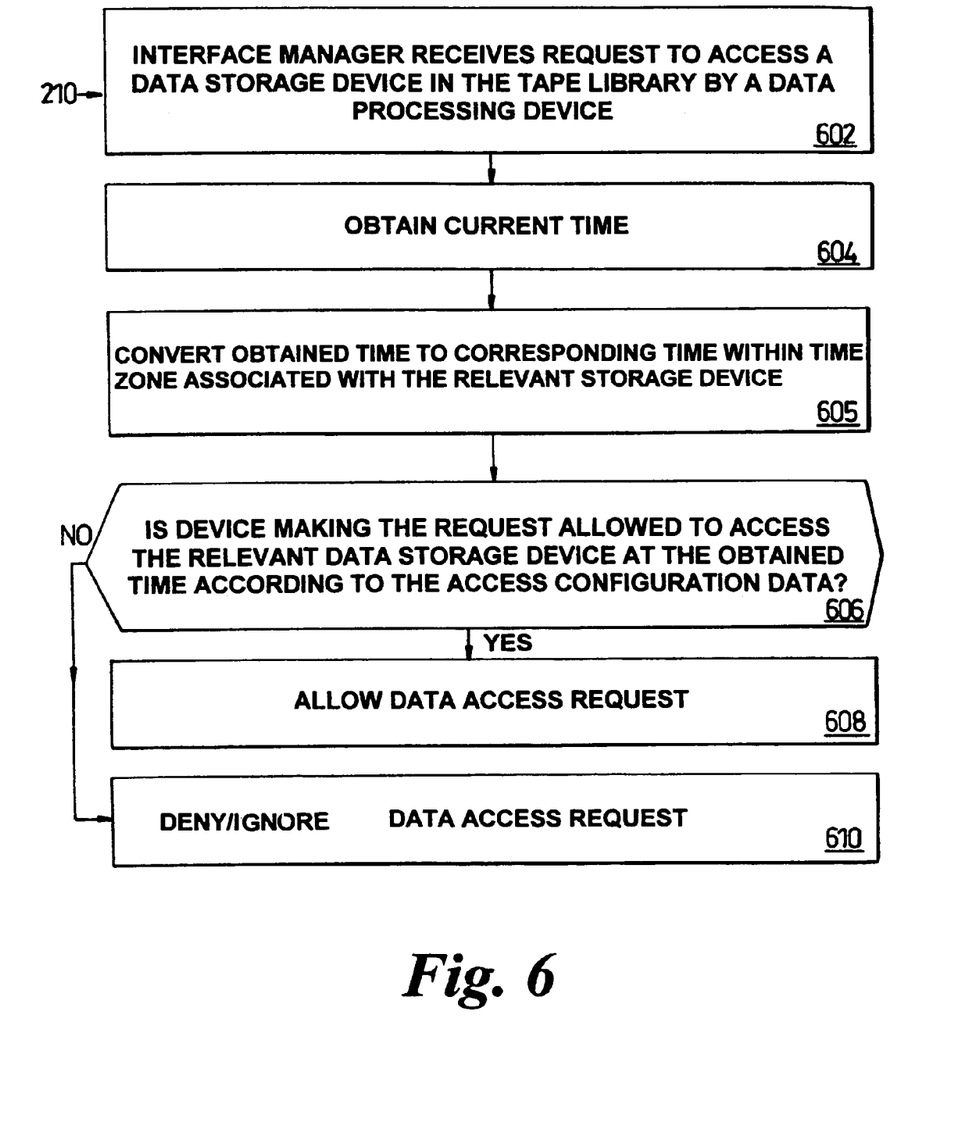
FIG. 6 illustrates schematically an example of acts involved in enforcing av access configuration, in accordance with an exemplary embodiment of the invention.

FIG. 6 illustrates an example of acts that can be involved in the access configuration enforcing process 210. At act 602 the router 108 (or interface manager 110) receives a request from a host computer to access a tape storage device 109 in the library 106. At act 604 data representing the current time is obtained. Act 605 is performed by embodiments of the system where the access configuration data can associate time zones with relationships/devices. Typically, the local time zone of the storage device will be used to determine whether the host is to be allowed access or not. At act 605 the obtained current time is converted into the corresponding current time within the time zone associated with the storage device.

At act 606 a question is asked whether the host device making the request is allowed to access the specified data storage device at that time according to the access configuration data. Typically, if a host is not included in the list of "allowed" hosts (or if the host is specified as a "disallowed" host) of the access configuration valid at that time then this question will be answered in the negative. If the host is not specified as being allowed or disallowed by the current access configuration data then a default action (possibly user-specified using the access configuration file creating/editing application, for example) will be applied. The default action may be to allow the unspecified host to access the storage device; deny access or raise an inquiry as to whether access should be allowed. The inquiry may be made to a user of the host device making the request or to a network administrator.

If the question asked at act 606 is answered in the affirmative, control is passed on to act 608 and the host device is allowed to access the storage device. However, if the question asked at act 606 is answered in the negative then control is passed to act 610 and the data access request is denied or ignored. When a data access request is denied/ignored, the process may respond in various ways, e.g. an error message can be transferred to the host device that attempted access; a user may be asked if he wishes the specific access disallowed configuration that is preventing access to be overridden, or the request may simply be ignored (in which case existing error handling routines on the host device making the request may be invoked).

Figure 7:
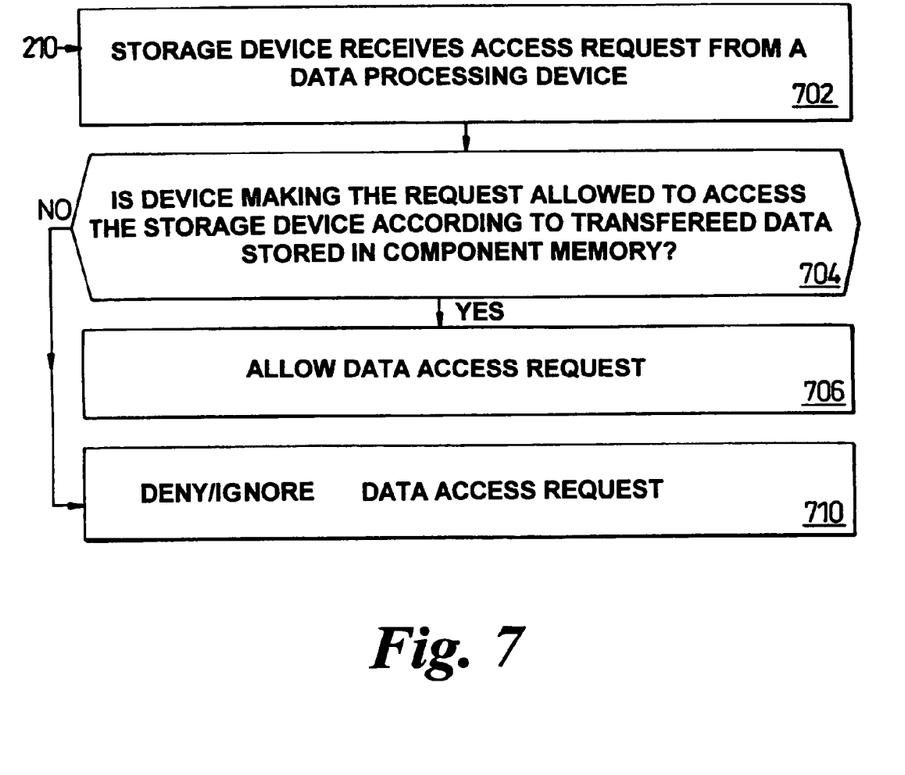
FIG. 7 illustrates schematically another example of acts involved in enforcing an access configuration, in accordance with an exemplary embodiment of the invention.

The examples given above will typically be applicable in a tape library 106 where all data requests are passed through its router 108. FIG. 7 illustrates acts that can be involved in the access configuration enforcement process 210 in a data storage system where each individual storage device can directly receive data transfer requests from host devices. In this case the storage devices may be part of a tape library where all data requests do not pass through a main router 108, or they may be stand-alone storage devices in communication with other devices over a network. The interface manager of the tape library may operate software 122 that applies the configuration access settings to the other storage devices, or another processor (e.g. a designated one of the storage devices in the network or an external server) could run the software. In this embodiment, it is normally more efficient if the transfer of access configuration data is only done when the access configuration of a particular storage device is to be modified and so the acts shown in FIG. 5 may be followed to apply the access configuration settings to each storage device. The data representing which host or hosts are allowed (or not allowed) to access each storage device is stored within a memory component of firmware in that storage device so that it effectively holds a set of identifiers of host devices that are allowed/not allowed to access the device.

At act 702 of FIG. 7 the storage device receives an access request from a host. At act 704 the firmware within the storage device executes instructions to check whether the host device making the request is allowed access. This typically involves checking whether the identifier of the host device is included within the set of "allowed host" identifiers stored in the memory. If the result of this check is positive then at act 706 the data access request is allowed. However, if the result of the check performed at act 704 is negative then at act 708 the data access request is denied or ignored. Thus, the storage device is capable of allowing or disallowing access to hosts based upon the current access configuration without having to store a copy of the access configuration file, or perform a check based on the current the time itself.

What is claimed is:

1. A method of controlling access to at least one data storage device in a tape library having a plurality of data storage devices and a plurality of tape locations for storing tapes for use in the data storage devices, the tape library being configured to receive data transfer requests over a Storage Area Network from at least one data processing device, the method including: obtaining data describing at least one data access relationship, said data access relationship specifying whether access to at least one said data storage device by at least one said data processing device is allowed or not allowed during at least one user defined time period, and controlling access to the at least one data storage device in accordance with said data access relationship described by the data.

2. A method according to claim 1, wherein the controlling of access includes: receiving a data transfer request from one of the data processing devices, the request specifying one of the data storage devices; obtaining data representing the current time; processing the data access relationship data to check whether the data processing device making the request is allowed to access the requested data storage device at the current time, and permitting or denying the data transfer request in accordance with the result of the check.

3. A method according to claim 2, wherein the data access relationship data includes data describing a time zone associated at least one of the data storage devices, the method further including converting the obtained current time to the corresponding current time within the time zone associated with the data storage device before the processing of the data access relationship data to check whether the data processing device making the request is allowed to access the requested data storage device at that time.

4. A method according to claim 1, wherein the controlling of access includes: obtaining data representing the current time; processing the data access relationship data to obtain data describing at least one of the data processing devices that is allowed or not allowed to access a particular said data storage device at the current time; transferring data describing the at least one data processing devices that is allowed or not allowed to access the particular said data storage device to a memory associated with the data storage device; receiving a data transfer request from a said data processing device at the data storage device; using the data storage device to check if the data processing device making the request is identified in the memory associated with the data storage device as a said processing device that is allowed access, and permitting or denying the data transfer request in accordance with the result of the check.

5. A method according to claim 1, wherein the data access relationship data includes identifier data associated with a said data storage device and/or a said data processing device, the identifier data including a WWN (World Wide Name) for a said data storage device, a WWN for a said data processing device, or the identifier data including an alternative identifier associated with at least one said data processing device.

6. A method according to claim 1, wherein the data access relationship data is in the form of a file including code for interpretation by an interpreter program.

7. A method according to claim 1, wherein the time period includes a period of time defined in terms of a day of a week; a month of a year; at least one specific date; a time interval defined by a start time and/or date and an end time and/or date, and/or a time interval defined by a start time and/or date and duration.

8. A method according to claim 7, wherein the data access relationship data further describes a recurrence of a said time period.

9. A tape library having a plurality of data storage devices and a plurality of tape locations for storing tapes for use in the data storage devices, the tape library being configured to receive data transfer requests over a Storage Area Network from at least one data processing device, the tape library including; an access data processor for obtaining data describing at least one data access relationship, a said data access relationship specifying whether access to at least one said data storage device by at least one said data processing device is allowed or not allowed during at least one user defined time period, and an access controller for controlling access to the at least one data storage device in accordance with the at least one data access relationship described by the data without using defined zones to restrict access to the data storage devices when a backup operation is in progress.

10. A tape library according to claim 9, wherein at least one of the data storage devices is a backup device.

11. A tape library according to claim 9, including an interface management component and a router through which access to the storage devices is controlled, wherein the interface management component and/or the router includes the access data processor and/or the access controller.

12. A computer-readable medium having instructions for causing one or more processors to control access to at least one data storage device in a tape library having a plurality of storage devices and a plurality of tape locations for storing tapes for use in the data storage devices, the tape library being configured to receive data transfer requests over a Storage Area Network from at least one data processing device, the instructions causing the one or more processors to perform acts comprising: obtaining data describing at least one data access relationship, said data access relationship specifying whether access to at least one said data storage device by at least one said data processing device is allowed or not allowed during at least one user defined time period, and controlling access to the at least one data storage device in accordance with said data access relationship described by the data.

13. The method of claim 1, further comprising controlling access to the at least one data storage device in accordance with the at least one data access relationship described by the data without using defined zones to restrict access to the data storage devices when a backup operation is in progress.

14. The method of claim 1, further comprising controlling access to the at least one data storage device in accordance with the at least one data access relationship described by the data without manually reconfiguring a storage device to specify which hosts are allowed access before, during and after a backup procedure.

15. A tape library according to claim 9, wherein access to the at least one data storage device is controlled in accordance with the at least one data access relationship described by the data without manually reconfiguring a storage device to specify which hosts are allowed access before, during and after a backup procedure.

16. A computer-readable medium of claim 12, wherein the instructions causing the one or more processors to perform acts further comprise controlling access to the at least one data storage device in accordance with the at least one data access relationship described by the data without using defined zones to restrict access to the data storage devices when a backup operation is in progress.

17. A computer-readable medium of claim 12, wherein the instructions causing the one or more processors to perform acts further comprise controlling access to the at least one data storage device in accordance with the at least one data access relationship described by the data without manually reconfiguring a storage device to specify which hosts are allowed access before, during and after a backup procedure.

* * * * *